United States Patent
Fakinlede et al.

(10) Patent No.: US 6,835,328 B2
(45) Date of Patent: Dec. 28, 2004

(54) OVERBASED METAL CARBONATE/CARBOXYLATE MICROEMULSIONS AND HALOGEN-CONTAINING POLYMERS CONTAINING SAME

(75) Inventors: Julius Fakinlede, Metuchen, NJ (US); Michael H. Fisch, Wayne, NJ (US); Ulrich Stewen, Schwerte (DE); Radu Bacaloglu, Hamburg, NY (US); Shah Mukund, Hazlet, NJ (US); Ilze Bacaloglu, Hamburg, NY (US); Wahib I. Farahat, Harrington Park, NJ (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 10/669,955

(22) Filed: Sep. 24, 2003

(65) Prior Publication Data

US 2004/0102555 A1 May 27, 2004

Related U.S. Application Data

(63) Continuation-in-part of application No. 10/191,440, filed on Jul. 8, 2002.

(51) Int. Cl.$^7$ .................. C09K 15/06; C09K 15/32; C07C 51/00; C07C 51/41; C08K 5/098
(52) U.S. Cl. ................... 252/400.52; 252/400.61; 252/407; 252/182.29; 554/156; 554/157; 515/31; 524/280; 524/395; 524/396; 524/400
(58) Field of Search ............... 252/400.52, 400.61, 252/407, 182, 29; 554/156, 157; 515/31; 524/280, 395, 396, 400

(56) References Cited

U.S. PATENT DOCUMENTS 3,147,232 A    9/1964   Norman et al.
4,052,350 A   10/1977   Shiohara et al.
4,060,508 A * 11/1977   Sugahara et al. ........... 523/440
4,085,077 A *  4/1978   Dworkin et al. ............ 524/178
4,329,182 A    5/1982   Sugahara et al.
4,501,840 A *  2/1985   Werle et al. ................ 524/387
4,661,544 A *  4/1987   Quinn ........................ 524/109
4,665,117 A *  5/1987   Quinn ........................ 524/327
5,102,933 A    4/1992   Bae et al.
5,322,872 A    6/1994   Quinn
5,350,785 A    9/1994   Sander et al.
5,492,949 A    2/1996   Drewes et al.
5,501,807 A *  3/1996   Benda et al. ............... 508/460
5,516,827 A    5/1996   Kaufhold et al.

(List continued on next page.)

FOREIGN PATENT DOCUMENTS

| EP | 0 597 671 | 5/1994 |
|---|---|---|
| EP | 0 837 094 | 4/1998 |
| WO | WO 94/26686 | 11/1994 |
| WO | WO 02/094925 | 11/2002 |

Primary Examiner—Joseph D. Anthony
(74) Attorney, Agent, or Firm—Michael P. Dilworth

(57) ABSTRACT

A metal carbonate/carboxylate microemulsion imparting static and dynamic thermal stability to a halogen-containing polymer is provided which comprises (a) a metal carbonate/carboxylate obtained from the reaction of an oxide and/or hydroxide of a metal selected from the group consisting of sodium, potassium, calcium, magnesium, zinc and mixtures thereof and an aliphatic acid in which the aliphatic moiety contains up to about 30 carbon atoms and carbon dioxide in an oil;

b) one or more non-phenolic compounds having about two or about three hydroxyl groups; and, c) one or more polyols, alcohol ethoxylates and/or alcohol propoxylates having from about 6 to about 24 carbon atoms in the alcohol and/or 0 to 3 ethylene oxide units and/or 0 to 3 propylene oxide units.

24 Claims, 2 Drawing Sheets

Static Thermal Stability 177 C Flexible field PVC
Liquid stabilizers: BaZnL53-Barium/Zinc control; CaZnL53A, CaZnL53B, CaZnL53C and CaZnl53D n w Calcium/Zinc stabilizers

U.S. PATENT DOCUMENTS

| | | | |
|---|---|---|---|
| 5,519,076 A * | 5/1996 | Odaira et al. ............... 524/112 | |
| 5,519,077 A | 5/1996 | Drewes et al. | |
| 5,534,566 A | 7/1996 | Wehner et al. | |
| 5,543,449 A | 8/1996 | Drewes et al. | |
| 5,656,202 A | 8/1997 | Brecker et al. | |
| 5,670,563 A | 9/1997 | Zinke et al. | |
| 5,814,691 A | 9/1998 | Kuhn et al. | |
| 5,872,166 A | 2/1999 | Brilliant et al. | |
| 5,880,189 A | 3/1999 | Croce et al. | |
| 5,891,571 A | 4/1999 | Herbert | |
| 5,919,741 A | 7/1999 | Jaynes et al. | |
| 5,925,696 A | 7/1999 | Wehner et al. | |
| 6,013,703 A | 1/2000 | Kuhn et al. | |
| 6,084,013 A | 7/2000 | Wehner | |
| 6,136,900 A | 10/2000 | Kuhn et al. | |
| 6,156,830 A | 12/2000 | Wehner et al. | |
| 6,194,494 B1 | 2/2001 | Wehner et al. | |
| 6,689,893 B2 * | 2/2004 | Reddy et al. ............... 554/156 |
| 2003/0050490 A1 * | 3/2003 | Reddy et al. ............... 554/2 |
| 2003/0104954 A1 * | 6/2003 | Reddy et al. ............... 508/460 |

\* cited by examiner

Figure 1 Static Thermal Stability 177 C Flexible field PVC
Liquid stabilizers: BaZnL53-Barium/Zinc control; CaZnL53A,
CaZnL53B, CaZnL53C and CaZnl53D n w Calcium/Zinc stabilizers
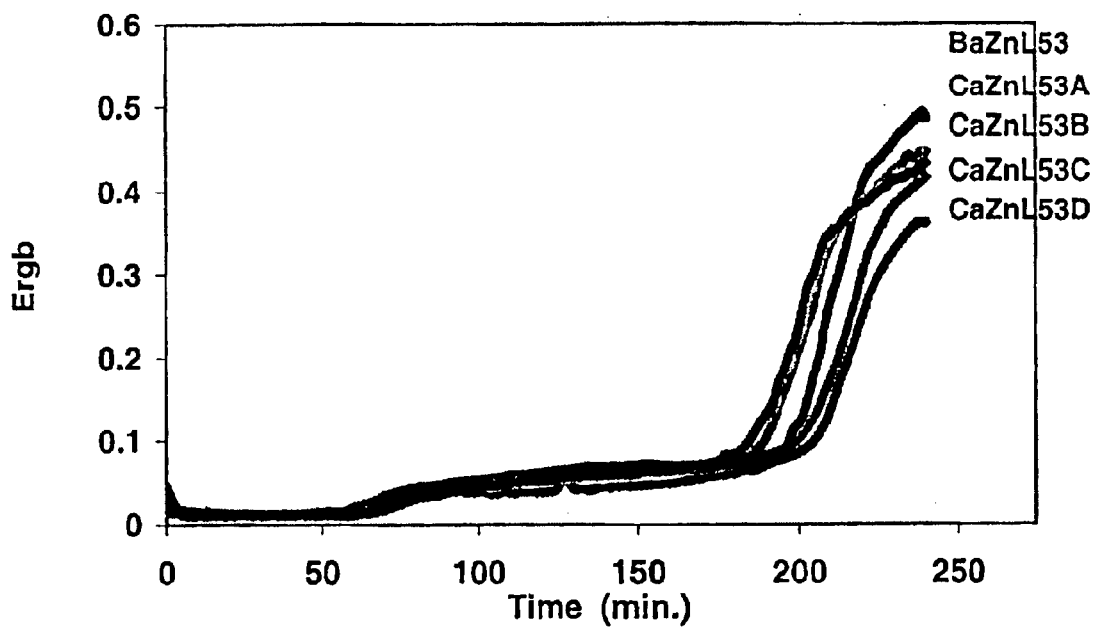
Figure 2 Static thermal stability 190 °C
PVC Flexible FDA sanctioned
Liquid stabilizers:CaZnL15-Calcium/Zinc control;
CaZnL15A and CaZnL15B new Calcium Zinc stabilizers
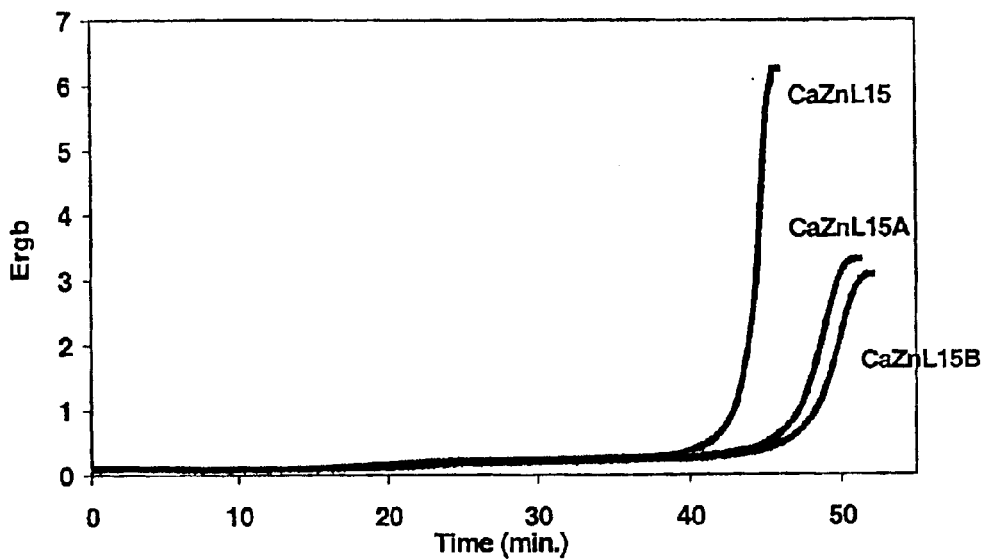

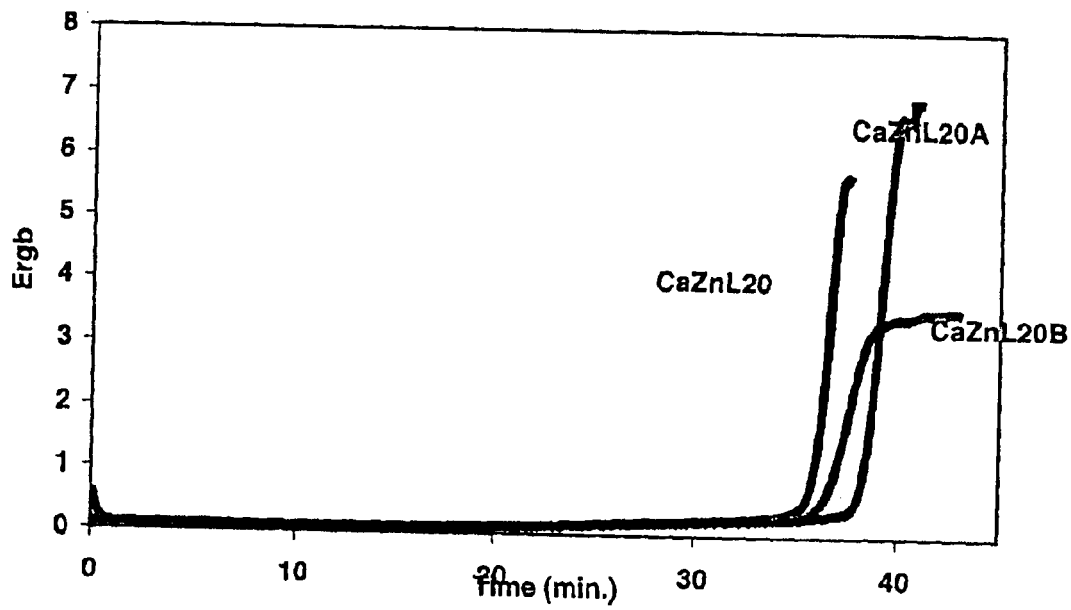
Figure 3 Static Thermal Stability 190 °C
Flexible PVC FDA Sanctioned
Liquid stabilizers: CaZnL20-Calcium/Zinc control, CaZnL20A and CaZnL20B-New Calcium/Zinc stabilizers
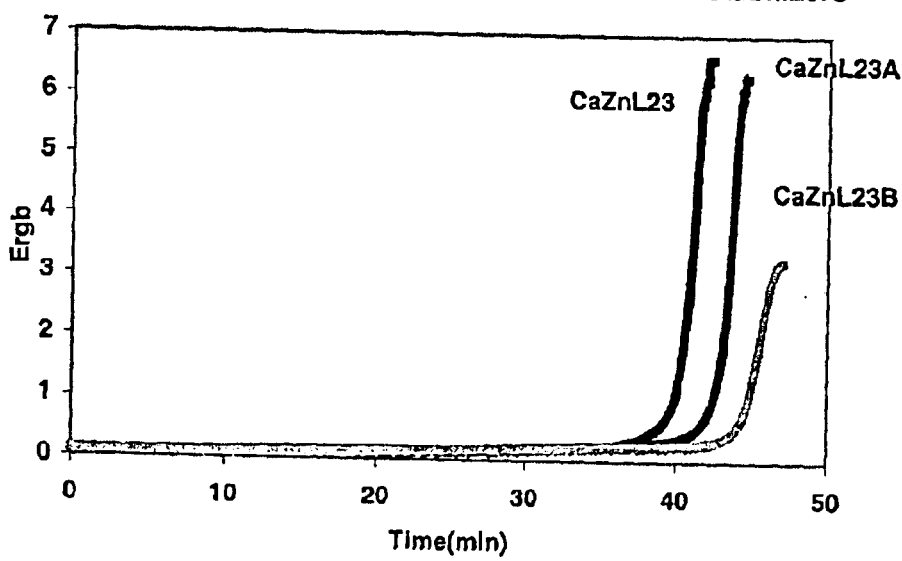
Figure 4 Static Thermal Stability 190 °C
PVC Flexible FDA sanctioned
Liquid stabilizers: CaZnL23-Calcium/Zinc control
CaZnL23A and CaZnL23B-new Calcium/Zinc stabilizers

OVERBASED METAL CARBONATE/CARBOXYLATE MICROEMULSIONS AND HALOGEN-CONTAINING POLYMERS CONTAINING SAME

CROSS-REFERENCE TO RELATED APPLICATIONS

This application is a continuation-in-part of co-pending U.S. application Ser. No. 10/191,440, filed Jul. 8, 2002.

BACKGROUND OF THE INVENTION

1. Technical Field

This invention generally relates to the stabilization of halogen-containing polymers such as polyvinyl chloride (PVC) resins. In particular, this invention relates to overbased metal carbonate/carboxylate liquid microemulsion compositions capable of providing static and dynamic thermal stability to food grade PVC resins subjected to thermal degradation.

2. Description of the Related Art

In general, PVC resins can be stabilized by a range of stabilizers. Typically, compounds containing heavy metals such as, for example, lead, cadmium and barium, have been utilized for this purpose but are problematic from an environmental and toxilogical standpoint, particularly in case of food grade PVC resins where the presence of most heavy metal-containing material is especially prohibited. Thus, there continues to be a need for effective stabilizers and stabilizer compositions in PVC resins that are substantially free of lead and other heavy metals which pose environmental and toxilogical problems.

The use of solid calcium and zinc carboxylates for stabilizing polymers, particularly food grade ("FDA compliant") PVC resins, is known. Attempts to provide such stabilizers in a liquid form to facilitate their handling and incorporation into the resins has been a technologically challenging goal.

Accordingly, there remains a need for liquid PVC stabilizers that have a long shelf life and impart thermal stability and satisfactory processability when incorporated in PVC resins. Additionally, it would also be desirable to provide liquid PVC stabilizers which reduce the tendency of the stabilized PVC resin compositions to form "fog" upon moderate heating.

SUMMARY OF THE INVENTION

It is an object of the present invention to provide stable, effective liquid microemulsion stabilizer compositions for the thermal stabilization, i.e., static and dynamic thermal stabilization, of halogen-containing polymers.

It is a particular object of this invention to provide food grade compositions of halogen-containing polymers such as PVC containing FDA compliant liquid microemulsions as thermal stabilizers.

In keeping with these and other objects of the invention, there is provided a liquid microemulsion composition imparting static and dynamic thermal stability to halogen-containing polymers which comprises:

a) a metal carbonate/carboxylate obtained from the reaction of an oxide and/or hydroxide of a metal selected from the group consisting of sodium, potassium, calcium, magnesium, zinc and mixtures thereof and an aliphatic acid in which the aliphatic moiety contains up to about 30 carbon atoms and carbon dioxide in an oil;

b) one or more non-phenolic compounds having about two or about three hydroxyl groups; and, c) one or more polyols and/or alcohol ethoxylates and/or alcohol propoxylates having from about 6 to about 24 carbon atoms in the alcohol, and 0 to 3 ethylene oxide units and/or 0 to 3 propylene oxide units.

Another aspect of the present invention is a halogen-containing polymer composition having improved resistance to deterioration mediated by heat, i.e., improved thermal stability, in addition to improved static and dynamic thermal stability comprising a halogen-containing polymer and a stabilizing amount of the foregoing liquid microemulsion composition effective to impart static and dynamic thermal stability to the halogen-containing polymer composition.

BRIEF DESCRIPTION OF THE DRAWINGS

FIG. 1 is a graph of the thermal stability at 177° C. of PVC formulated for use as a flexible FDA sanctioned material that has been treated with stabilizers of the present invention compared with a PVC treated with a barium/zinc based stabilizer commercially available as Mark 4753 (Crompton Corp.) and is outside the scope of the invention;

FIG. 2 is a graph of the thermal stability at 190° C. of PVC formulated for use as a flexible FDA sanctioned material that has been treated with stabilizers of the present invention compared with a PVC treated with a calcium/zinc based stabilizer commercially available as Mark 3155 (Crompton Corp.) and is outside the scope of the invention;

FIG. 3 is a graph of the thermal stability at 190° C. of PVC formulated for use as a flexible FDA sanctioned material that has been treated with stabilizers of the present invention compared with a PVC treated with a commercially available calcium/zinc based stabilizer outside the scope of the invention as a competitive calcium/zinc based stabilizer; and FIG. 4 is a graph of the thermal stability at 190° C. of PVC formulated for use as a flexible FDA sanctioned material that has been treated with stabilizers of the present invention compared with a PVC treated with a calcium/zinc based stabilizer commercially available as Mark 3023 (Crompton Corp.) and is outside the scope of the invention.

DESCRIPTION OF THE PREFERRED EMBODIMENTS

One useful aspect of the microemulsions of the present invention is that they avoid having to use components based on metals which have become environmentally objectionable, e.g., barium, cadmium and lead.

The overbased metal carbonate/carboxylate liquid microemulsions of the present invention are obtained from (a) one or more metal carbonate/carboxylates in an oil, (b) a promoter or phase transfer catalyst comprising one or more non-phenolic compounds having about two or about three hydroxyl groups and (c) a surfactant comprising one or more polyols and/or alcohol ethoxylates and/or alcohol propoxylates and having from about 6 to about 24 carbon atoms in the alcohol and 0 to 3 ethylene oxide units and/or 0 to 3 propylene oxide units.

A first component of the metal carbonate/carboxylate microemulsions is a metal carbonate/carboxylate obtained from the reaction of a basic metal compound and an aliphatic acid in which the aliphatic moiety contains up to 30 carbon atom followed by carbonation with an acidic gas, e.g., carbon dioxide, in an oil to form an overbased metal carbonate/carboxylate microemulsions. Suitable basic metal compounds for use herein include, but are not limited to, calcium oxide, calcium hydroxide, magnesium oxide, magnesium hydroxide, sodium hydroxide, potassium hydroxide, zinc oxide, zinc hydroxide and combinations thereof with calcium hydroxide and zinc oxide being preferred.

The aliphatic acid of the present invention can include both saturated and unsaturated aliphatic acids in which the aliphatic moiety contains from about 6 to about 30 carbon atoms and preferably from about 7 to about 16 carbon atoms. Suitable aliphatic acids include, but are not limited to, caprylic acid, capric acid, lauric acid, myristic acid, myristoleic acid, decanoic acid, dodecanoic acid, pentadecanoic acid, palmitic acid, palmitoleic acid, margaric acid, stearic acid, 12-hydroxystearic acid, oleic acid, ricinoleic acid, linoleic acid, arachidic acid, gadoleic acid, eicosadienoic acid, behenic acid, erucic acid, tall oil fatty acids, rapeseed oil fatty acid, linseed oil fatty acid and the like and mixtures of any of these acids. Preferred aliphatic acids for use herein are oleic acid and tall oil fatty acids.

Generally, the overbased metal carbonate/carboxylate(s) are microemulsions, homogeneous looking systems characterized by a metal content in excess of that which would be present according to the stoichiometry of the metal and the particular aliphatic acid reacted with the metal. The amount of excess metal is commonly expressed in terms of metal ratio. The term "metal ratio" is the ratio of the total equivalents of the metal to the equivalents of the aliphatic acid. A neutral metal salt has a metal ratio of one. A salt having 4.5 times as much metal as present in a neutral salt will have metal excess of 3.5 equivalents, or a ratio of 4.5. The ratios between the metal carbonate to metal carboxylate is about 0.2 to about 10, preferably from about 0.5 to about 7 and most preferably from about 0.7 to about 5.

As one skilled in the art would readily appreciate, the overbased metal carbonate/carboxylate is prepared by reacting a mixture containing at least a stoichiometric excess of the foregoing basic metal compound(s), any of the foregoing aliphatic acid(s), an oil, a promoter and a surfactant with an acidic gas, e.g., $SO_2$ or $CO_2$. Preferably the acidic gas is $CO_2$.

The oil used for preparing and containing the metal carbonate/carboxylates will normally be an inert solvent for the aliphatic acid. Solvents which can be employed herein include oils and, optionally, an organic material which is readily soluble or miscible with oil. It is particularly advantageous to employ a high boiling, high molecular weight solvent so as to produce a halogen-containing polymer composition having a reduced tendency to form "fog" in use.

The reduced tendency of a halogen-containing polymer such as PVC resins to form "fog" in use is also expressed herein as a reduced tendency of the resin additives to volatilize, by which is meant that the resin manufactured products emits a reduced amount of, and preferably little or no, volatile compounds into the ambient atmosphere when the resin is exposed to moderate heat, typically temperatures ranging from, for example, about 60° to about 130° C. (140° to 270° F.). Such compounds emitted by polyvinyl chloride resin manufactured products under such conditions can comprise one or more components of the additives used in the manufacture of polyvinyl chloride, products of the degradation of one more of these additives, compounds formed by the reaction of any such emitted compounds or degradation products, or mixtures of any of the foregoing.

Suitable high boiling, high molecular weight solvents for use herein include parrafinic oils having boiling points higher than about 170° C. Commercially available oils of this type known to one skilled in the art include, e.g., those available from such sources as Exxon under the Isopar® tradenames, e.g., Isopar® M, Isopar® G, Isopar® H, and Isopar® V, and Telura® tradename, e.g., Telura® 407, and Crompton Corporation available as carnation oil. Suitable organic solvents include unsubstituted or substituted aromatic hydrocarbons, ethoxylated long chain alcohols, e.g., those ethoxylated alcohols having up to about 20 carbon atoms, and mixtures thereof. Useful unsubstituted or substituted aromatic hydrocarbons include high flash solvent naptha and the like.

When carbonation of the mixtures takes place through the use of an acidic gas, e.g., carbon dioxide, the amount of acidic gas used depends in some respects upon the desired basicity of the product in question and also upon the amount of basic metal compound employed which, as discussed above, will vary (in total amount) from about 1 to about 10, preferably from about 1.2 to about 8 and most preferably from about 1.7 to about 6.0 equivalents per equivalent of aliphatic acid. The acidic gas is generally blown below the surface of the reaction mixture that contains additional (i.e., amounts in excess of what is required to convert the aliphatic acid quantitatively to the metal carboxylate salt) base after the metal carboxylate intermediate is formed. The process of carbonation which is a part of the process of obtaining the metal carbonate/carboxylate is well known to those skilled in the art. The acidic gas employed during the carbonation step is used to react with the excess basic metal compound which may be already present or which can be added during the carbonation step. The mixtures of products obtained after carbonation are referred to herein as metal carbonate/carboxylates of this invention which include, e.g., calcium carbonate formed from the reaction of carbon dioxide with calcium hydroxide and zinc carbonate formed from the reaction of carbon dioxide with zinc oxide.

An important component of the metal carbonate/carboxylate microemulsions is a promoter or a phase transfer catalyst, e.g., triethanolamine, diethanolamine, ethanolamine, etc. Promoters are advantageously employed in the carbonation process to facilitate the incorporation of the large excess basic metal compound into the aqueous microdroplets of the microemulsion. Suitable promoters include one or more non-phenolic compounds containing about 2 or more hydroxyl groups and preferably about 2 or about 3 hydroxyl groups. Examples of these compounds include, but are not limited to, glycerin, glycerol monooleate, diethylene glycol, triethylene glycol, dipropylene glycol, tripropylene glycol, diethylene glycol monobutyl ether, and the like. A preferred promoter for use herein is glycerin. Amounts of promoter will ordinarily range from about 1% to about 25%, preferably from about 1.5% to about 20% and most preferably from about 2% to about 16% of acid charge. Amounts of the phase transfer catalysts can vary widely, e.g., ranging from about 1% to about 25%, preferably from about 1.5% to about 20% and most preferably from about 2% to about 16% of acid charge.

The third component of the microemulsion of the present invention is a surfactant comprising one or more polyols and/or alcohol ethoxylates and/or alcohol propoxylates each of these having from about 6 to about 24 carbon atoms in the alcohol and 0 to 3 ethylene oxide units and/or 0 to 3 propylene oxide. Compounds of this type include, but are not limited to, high molecular weight alcohols, e.g., those having a molecular weight greater than about 186. Suitable surfactants for use herein include sorbitol, pentaerythritol, sugar alcohols and their alkoxylated derivatives and the like. A preferred surfactant for use herein is sorbitol. Other useful surfactants are long chain ethoxylated alcohols, i.e., those having up to at least about 20 carbon atoms, and include commercially available alcohols such as those available from such sources as Shell under the Neodol tradenames, e.g., Neodol® 23.1, Neodol® 25.1 and Condea Vista under the Alfol tradename, e.g., Alfol® 1216.15. The surfactants can be employed in an amount ranging from about 0.5 weight % to about 25 weight %, preferably from about 1 weight % to about 10 weight % and most preferably from about 3 weight % to about 8 weight %.

The metal carbonate/carboxylate microemulsions are prepared by conventionally reacting by carbonation the foregoing components in the oil at suitable temperatures, e.g., about 100° C. to about 220° C. and preferably at about 140° C. to about 210° C., such that the viscosity of the microemulsion does not become exceedingly high, i.e., a viscosity not exceeding about 10,000 cP. Following the reaction, the reaction product can be purified from solid impurities employing known and conventional means, e.g., filtration.

The microemulsions compositions are preferably used to advantage in combination with halogen-containing organic polymers, e.g., halogen-containing plastic materials, to form the stabilized halogen-containing organic polymers. These halogen-containing organic polymers include homopolymers such as the polyvinyl chloride-type polymers, e.g., polyvinyl chloride and polyvinylidene chloride. These polymers can also include those polymers formed by the copolymerization of vinyl chloride with other unsaturated monomers. Unsaturated monomers can be compounds which contain polymerizable carbon-to-carbon double bonds and include, for example, alpha olefins such as, e.g., ethylene, propylene and 1-hexene; acrylates such as, e.g., acrylic acid, ethyl acrylate and acrylonitrile; vinyl monomers such as, e.g., styrene and vinyl acetate and/or maleates such as, e.g., maleic acid, maleic anhydrides and maleic esters. Particularly preferred resins to which the compounds of this invention are added are the chlorine-containing polymers, particularly PVC, and compositions containing these resins.

The microemulsions compositions of the present invention can also be used with plasticized polyvinyl chloride resin compositions of conventional formulation. Conventional plasticizers well known to those skilled in the art can be employed. Examples of such plasticizers are phthalates, esters of aliphatic dicarboxylic acids, trimellitates, epoxy plasticizers, polymer plasticizers and phosphoric esters.

Generally, the microemulsions compositions are used in amounts effective to impart static and dynamic thermal stability, i.e., resistance to heat-mediated deterioration of the halogen-containing polymers such as PVC or other polyvinyl chloride resin and compositions obtained therefrom of the present invention. That is, "heat-mediated deterioration" includes deterioration which is due to exposure to excessive heat, as well as deterioration which is initiated or accelerated by exposure to heat. Effective static and dynamic thermal stability is afforded generally by adding an effective heat stabilizing amount ranging from about 0.5 to about 10 and preferably from about 0.8 to about 5 and preferably from about 1 to about 3 parts per hundred parts resin (phr). These microemulsion compositions of metal carbonate/carboxylate can be added to the chlorine containing resin as such or in mixtures with other types of intermediates for stabilizers. Examples of such intermediates may be diketones, phosphites, metal carboxylates, antioxidants, radical scavengers and similar compounds that contribute to avoid thermal degradation of the resin.

Examples of diketone stabilizer components are dibenzoyl methane, stearoyl benzoyl methane, distearoyl methane, and the like. Examples of phosphite stabilizer components are tris nonyl phenyl phosphite, tris (2-ethylhexyl) phosphite, phenyl di(2-ethylhexyl) phosphite, tris(isodecyl) phosphite and the like. Examples of other metal carboxylate stabilizer components are calcium stearate, calcium oleate, calcium 2-ethyl hexanoate, zinc 2-ethyl hexanoate, zinc oleate, zinc stearate and the like. Examples of phenolic antioxidant stabilizer components are commercially available antioxidants such as those available from such sources as Ciba SC under the Irganox® tradename, e.g., Irganox® 1076, Irganox® 1010, and Irganox® 1135, ICI under the Topanol tradename. Examples of radical scavengers are Tinuvin® 770, Chimasorb® 944, Chimasorb® 119 (each available from Ciba SC), Chimasorb UV-3346 (Cytec) and Lovilite® 76 (Great Lakes).

The stabilized halogen-containing organic polymers, e.g., stabilized polyvinyl chloride resin compositions, comprising these components can also contain conventional additional additives such as lubricants, flame retardants, fillers, pigments, UV absorbers, impact modifier, processing aids and the like, in relative amounts effective to fulfill the desired functions of each such ingredient. These ingredients can be added, if desired, prior to, during, or subsequent to the step in which the micro emulsion of the present invention or its mixtures with other stabilizer components is compounded into the polyvinyl chloride resin composition.

Examples of lubricants are those selected from the group consisting of montan wax, fatty acid esters, PE waxes, amide waxes, chlorinated paraffins, glycerol esters, fatty ketones, silicone-based lubricants and combinations thereof.

Examples of fillers can be one or more of the group consisting of dolomite, wollastonite, silicates, clay, talc, glass fibers, glass beads, wood flour, mica, carbon black, graphite, rock flour, heavy spar, talc, kaolin and chalk.

Examples of pigments can be those selected from the group consisting of $TiO_2$ zirconium oxide-based pigments, $BaSO_4$, zinc oxide (zinc white) and lithopones (zinc sulfide/barium sulfate), carbon black, carbon black/titanium dioxide mixtures, iron oxide pigments, $Sb_2O_3$, (Ti, Ba, Sb) $O_2$, $Cr_2O_3$ spinels, such as cobalt blue and cobalt green, Cd (S, Se), ultramarine blue, organic pigments, for example, azo pigments, phthalo-cyanine pigments, quinacridone pigments, perylene pigments, diketopyrrolopyrrole pigments and anthraquinone pigments.

Examples of processing aids are commercially available processing aids available from such sources as Rohm and Haas under the Paraloid® tradename, e.g., Paraloid® K-120N, Paraloid® K-125, Paraloid® K-147, Elf Atochem under the Metablue® tradename, e.g., Metablue® P-501 and Metablue® P-550.

Examples of impact modifiers are commercially available impact modifiers available from such sources as Rohm and Haas under the Paraloid® tradename, e.g., Paraloid® BTA 715, Paraloid® BTA 733 and Paraloid® KM Kaneka under the Kane Ace® tradename, e.g., Kane Ace® B-52 and Kane Ace® B-58, and Dow Chemical under the Tyrene® tradename, e.g., Tyrene® 3615, and Tyrin 3614A.

The following non-limiting examples are illustrative of the present invention.

EXAMPLE 1

200 g of $Ca(OH)_2$ and 900 ml of Isopar M (isoparaffin solvent, Exxon) were charged in a 3-L four necked round bottom flask and with agitation was heated to 125° C. Slowly 318 g of oleic acid was added. $CO_2$ was introduced at 240 ml/min while maintaining the temperature of the reaction at 125° C. The total rate of water collected was monitored in an attached Dean-Stark. Once all of the oleic acid was added, carbonation was stopped and the temperature was allowed to go to 193° C. At this point, 2 ml of water was collected.

10 grams of sorbitol, slurried in 100 ml Isopar M, was then added. Carbonation was restarted at 240 ml/min of $CO_2$ and accompanied with a gradual addition of glycerin (around 1 ml/min) until a total of 42 ml of glycerin was added. When the presence of $Ca(OH)_2$ was no longer evidence as indicated by titration, the reaction was allowed to proceed for an additional one hour with continuous carbonation. A total of 48 ml water was collected. The reaction product was filtered of solid materials and stripped to remove any remaining solvent. A clear golden yellow product having 9.2 weight % Ca (1.5 weight % as oleate and 7.7 weight % as carbonate) and a viscosity at 25° C. of 1010 cP was obtained.

EXAMPLE 2

200 G of $Ca(OH)_2$ and 900 ml of Isopar M were charged in a 3-L four necked round bottom flask and with agitation was heated to 140° C. Slowly 318 g of tall oil fatty acid with an average molecular weight of 288 was added with $CO_2$ being introduced at 240 ml/min while maintaining the temperature of the reaction at around 140° C. The total rate of water collection was monitored in an attached Dean-Stark. Once all of the tall oil fatty acid was added, carbonation was stopped and the temperature was allowed to go to 190° C. At this point, 5 ml of water was collected.

10 grams of sorbitol, slurried in 100 ml Isopar M, was added and the reaction mixture was then heated to 190° C. Next, 15 ml of glycerin was added. Carbonation was restarted at 240 ml/min and accompanied with a gradual addition of glycerin (around 1 ml/min) until a total of 45 ml glycerin was added. When the presence of $Ca(OH)_2$ was no longer evident as indicated by titration, the reaction was allowed to proceed for an additional one hour with continuous carbonation. A total of 50 ml water was collected. The reaction product was filtered of solid materials and stripped to remove any remaining solvent. A clear golden yellow product having 10.3 weight % Ca (2.3 weight % as tallate and 8.0 weight % as carbonate) and a viscosity at 25° C. of 1240 cP was obtained.

EXAMPLE 3

Into a 12 liter flask, with agitation, was charged Alfonic 1216-1.3 (mixture of alcohols $C_{12}$–$C_{26}$ ethoxylated with 1 3 ethylene oxide (1338 g), Neodol 45 (mixture of alcohols containing mostly $C_{14}$ alcohol) (180 g), Isopar G (Isoparaffinic solvent, Exxon) (3600 ml), and calcium hydroxide (733 g) and heated to 140° C. Neodecanoic acid (582 g) was slowly added with removal of formed water of neutralization and the temperature was increased to 160° C. 20 grams glycerin was then added, followed by a continuous addition of $CO_2$ at the rate of 221 ml/min into the reaction system. To prevent foaming, subsequent glycerin additions were made. After a total addition of 180 g glycerin lasting 8 hours, the reaction mixture was carbonated for an addition three hours until 211 g of total water distillate was collected. The reaction product was filtered of solid materials and stripped to remove solvent. A light yellow product having 10.9 weight % Ca (1 weight % Ca as hydroxide, 2.3 weight % Ca as neodecanoate and 7.6 weight % Ca as carbonate) and a viscosity at 25° C. of 1550 cP was obtained.

EXAMPLE 4

Into a 3-L resins flask, was charged carnation oil (250 g), oleic acid FDA (129 g), ZnO (20 g) and 20 ml water. The reactor was heated to 107° C. with vigorous agitation until the contents became clear. The reaction temperature was increased to 140° C. and 15 ml water was removed. An additional 45 g of ZnO was added to the flask and agitation was continued for 5 minutes. 10 grams of sorbitol was then added and the reaction temperature was increased to 180° C. 20 grams of glycerin was charged and after a few minutes of agitation, carbonation was started at the rate of 240 ml/min of $CO_2$ for 4 hours. The reaction product was then filtered of solid materials. A light yellow product having 5.8 weight % zinc (3 weight % Zn as oleate and 2.8 weight % Zn as carbonate) and a viscosity at 25° C. of 1034 cP was obtained.

EXAMPLE 5

Into a 3-L resins flask, was charged carnation oil (176.2 g), oleic acid FDA (216.6 g), ZnO (31.2 g) and 20 ml of water. The mixture was heated to 104° C. with vigorous agitation until the contents became clear. The reaction temperature was increased to 140° C. and 15 ml water was removed. An additional 31.2 g of ZnO was added to the flask and agitation was continued for 5 minutes. 15 grams of sorbitol was then added and the reaction temperature was increased to 180° C. 20 grams of glycerin was charged and after a few minutes of agitation, carbonation was started at the rate of 240 ml/min of $CO_2$ for 5 hours. The reaction product was then filtered of solid materials. A brown product having 9.42 weight % zinc (5 weight % Zn as oleate and 4.42 weight % Zn as zinc carbonate) and a viscosity at 25° C. of 1165 cP was obtained.

EXAMPLE 6

Into 1 3-L resins flask, was charged carnation oil (143.8 g), Tall oil fatty acid (258.9 g), ZnO (37.3 g) and 20 ml of water. The mixture was heated to 103° C. with vigorous agitation until the contents became clear. The reaction temperature was increased to 130° C. and 15 ml water was removed. An additional 27 g ZnO was added to the flask and agitation was continued for 5 minutes. 15 grams sorbitol was then added and the reaction temperature was increased to 140° C. 20 grams glycerin was then charged and after few minutes of agitation, carbon dioxide was introduced at the rate of 240 ml/min for 5 hours. The temperature was allowed to increase to 180° C. during carbonation. The reaction product was then filtered of solid materials. A brown liquid having 10.1 weight % zinc (6 weight % Zn as oleate and 4.1 weight % Zn as zinc carbonate) and a viscosity at 25° C. of 1560 cP was obtained.

EXAMPLE 7

Into 1 3-L resins flask, was charged carnation oil (143.8 g), oleic acid (258.9 g), ZnO (37.2 g) and 20 ml of water. The mixture was heated to 106° C. with vigorous agitation until the contents became clear. The reaction temperature was increased to 160° C. An additional 27 g of ZnO was added to the flask and agitation was continued for 5 minutes. 15 grams sorbitol was then added and the reaction temperature was increased to 180° C. 20 grams glycerin was charged and after a few minutes of agitation, carbonation was started at the rate of 240 ml/min of $CO_2$. After 5 hours of carbonation, 10 g $Ca(OH)_2$ was added and carbonation was continued at the same rate for 2 hours. The reaction product was then filtered of solid materials. A light brown product having 8.8 weight % zinc (as a mixture of zinc oleate and zinc carbonate), 0.4 weight % calcium(as a mixture of oleate and carbonate) and a viscosity at 25° C. of 640 cP was obtained.

EXAMPLE 8

Into a one liter four neck flask, 150 grams carnation oil, 150 grams Neodol 23.1 and 138 grams calcium hydroxide was charged. The mixture was heated to 150–155° C. with agitation. 84.5 grams tall oil fatty acid and 25 grams triethanolamine was then added. While collecting water, 75.5 grams carbon dioxide was added over the period of 4 hours. The crude product was then filtered to yield clear amber liquid having 9% calcium and viscosity of 130 cps at 25° C.

EXAMPLE 9

Static thermal stability of PVC (Oxy 225 available from Polyone) containing microemulsion compositions within the scope of this invention were compared in relatively equivalent amounts to PVC (Oxy 225 available from Polyone) containing microemulsion compositions outside the scope of this invention by evaluating the color (Ergb) change against time as presented in FIGS. 1–4. In FIG. 1, the barium microemulsion (outside the scope of this invention) has been replaced by the calcium microemulsion (within the scope of this invention) without expensive optimization or addition of high cost co-stabilizers. In FIGS. 2–4, commercial Ca/Zn FDA compliant stabilizers (outside the scope of this invention) have been replaced by Ca/Zn stabilizers (within the scope of this invention) showing improved performance at lower cost.

Although the present invention has been described in preferred forms with a certain degree of particularity, many changes and variations are possible therein and will be apparent to those skilled in the art after reading the foregoing description. It is therefore to be understood that the present invention may be practiced otherwise than as specifically described herein without departing from the spirit and scope thereof.

What is claimed is:

1. A liquid microemulsion useful as a thermal stabilizer for polyvinyl chloride resin and which exhibits a reduced amount of volatile components when heated comprising:
   a) an overbased metal carbonate/carboxylate obtained from the reaction of an oxide and/or hydroxide of a metal selected from the group consisting of sodium, potassium, calcium, magnesium, zinc and mixtures thereof and an aliphatic acid in which the aliphatic moiety contains up to about 30 carbon atoms and carbon dioxide in an oil;
   b) one or more non-phenolic compounds having about two or about three hydroxyl groups; arid,
   c) one or more polyols, or ethoxylates and/or propoxylates of an alcohol having from about 6 to about 24 carbon atoms.

2. The microemulsion of claim 1 wherein the oil is a parrafinic oils having a boiling point higher than about 170° C.

3. The microemulsion of claim 1 wherein the reaction of component (a) further comprises an organic material which is readily soluble or miscible with the oil.

4. The microemulsion of claim 3 wherein the organic material is selected from the group consisting of substituted aromatic hydrocarbons, unsubstituted aromatic hydrocarbons and ethoxylated alcohols.

5. The microemulsion of claim 1 wherein the equivalent ratio of the oxide and/or hydroxide of the metal compound to aliphatic acid is about 1 to about 10.

6. The microemulsion of claim 1 wherein the aliphatic acid is selected from the group consisting of caprylic acid, capric acid, lauric acid, myristic acid, myristoleic acid, decanoic acid, dodecanoic acid, pentadecanoic acid, palmitic acid, palmitoleic acid, margaric acid, stearic acid, 12-hydroxystearic acid, oleic acid, ricinoleic acid, linoleic acid, arachidic acid, gadoleic acid, cicosadienoic acid, behenic acid, crucic acid, tall oil fatty acid, rapeseed oil fatty acid, linseed oil fatty acid and mixtures thereof.

7. The microemulsion of claim 1 wherein component (b) is selected from the group consisting of glycerin, glycerol monooleate, ethylene glycol, diethylene glycol, triethylene glycol, propylene glycol, dipropylene glycol, tripropylene glycol, diethylene glycol monobutyl ether, triethanolamine, diethanolamine and ethanolamine.

8. The microemulsion of claim 1 wherein component (c) is selected from the group consisting of sorbitol, pentaerythritol, sugar alcohols and mixtures thereof.

9. The microemulsions of claim 1 wherein component (b) of the microemulsion is glycerin and component (c) is sorbitol.

10. The microemulsions of claim 1 wherein component (b) is triethanolamine and component (c) is an ethoxylated alcohol.

11. The microemulsion of claim 1 wherein the metal carboxylate of component (a) is obtained from calcium hydroxide and zinc oxide, the aliphatic acid of component (a) is oleic acid, component (b) is glycerin and component (c) is sorbitol.

12. The microemulsion of claim 2 wherein the metal carboxylate of component (a) is obtained from calcium hydroxide and zinc oxide, the aliphatic acid of component (a) is talloil acid, component (b) is glycerin and component (c) is sorbitol.

13. A process for preparing a liquid microemulsion useful as a thermal stabilizer for polyvinyl chloride resin and which exhibits a reduced amount of volatile components when heated comprises the step of reacting in an oil, either simultaneously or sequentially, and in the presence of an acidic gas (a) an oxide and/or hydroxide of a metal selected from the group consisting of sodium, potassium, calcium, magnesium, zinc and mixtures thereof, (b) an aliphatic acid in which the aliphatic moiety contains up to about 30 carbon atoms, (c) one or more non-phenolic compounds having about two or about three hydroxyl groups; and, (d) one or more polyols, or ethoxylates and/or propoxylates ethoxylates and/or propoxylates of an alcohol having from about 6 to about 24 carbon atoms.

14. The process of claim 13 wherein the oil is a parrafinic oils having a boiling point higher than about 170° C.

15. The process of claim 13 wherein the oil further contains an organic material which is readily soluble or miscible with the oil.

16. The process of claim 15 wherein the organic material is selected from the group consisting of substituted aromatic hydrocarbons, unsubstituted aromatic hydrocarbons and ethoxylated alcohols.

17. The process of claim 13 wherein the equivalent ratio of the oxide and/or hydroxide of the metal compound to aliphatic acid is about 1 to about 10.

18. The process of claim 13 wherein the aliphatic acid is selected from the group consisting of caprylic acid, capric acid, lauric acid, myristic acid, myristoleic acid, decanoic acid, dodecanoic acid, pentadecanoic acid, palmitic acid, palmitoleic acid, margaric acid, stearic acid, 12-hydroxystearic acid, oleic acid, ricinoleic acid, linoleic acid, arachidic acid, gadoleic acid, cicosadienoic acid, behenic acid, crucic acid, tall oil fatty acid, rapeseed oil fatty acid, linseed oil fatty acid and mixtures thereof.

19. The process of claim 13 wherein component (c) is selected from the group consisting of glycerin, glycerol monooleate, ethylene glycol, diethylene glycol, triethylene glycol, propylene glycol, dipropylene glycol, tripropylene glycol, diethylene glycol monobutyl ether, triethanolamine, diethanolamine and ethanolamine.

20. The process of claim 13 wherein component (c) of the microemulsion is glycerin and component (d) is sorbitol.

21. The process of claim 13 wherein component (c) of the microemulsion is triethanolamine and component (d) is an ethoxylated alcohol.

22. The process of claim 13 wherein the acidic gas is carbon dioxide.

23. The process of claim 13 wherein the temperature of the reaction is from about 100° C. to about 220° C.

24. The process of claim 13 wherein the basic metal calcium hydroxide and zinc oxide, the aliphatic acid is oleic acid or tall oil fatty acid, component (c) is glycerin and component (d) is sorbitol.

* * * * *